No. 715,664. Patented Dec. 9, 1902.
W. S. JARBOE.
PACKING FOR PISTON RODS.
Application filed Jan. 4, 1902.

(No Model.)

WITNESSES
INVENTOR
W. S. Jarboe
By Connolly Bros
Attorneys

UNITED STATES PATENT OFFICE.

WALTER S. JARBOE, OF PITTSBURG, PENNSYLVANIA.

PACKING FOR PISTON-RODS.

SPECIFICATION forming part of Letters Patent No. 715,664, dated December 9, 1902.

Application filed January 4, 1902. Serial No. 88,375. (No model.)

*To all whom it may concern:*

Be it known that I, WALTER S. JARBOE, a citizen of the United States, residing at Pittsburg, in the county of Allegheny and State of Pennsylvania, have invented certain new and useful Improvements in Packings for Piston-Rods; and I do hereby declare the following to be a full, clear, and exact description of the invention, such as will enable others skilled in the art to which it appertains to make and use the same.

My invention has relation to packings, and relates particularly to packings for piston-rods, valve-stems, pumps, &c., and has for its object the provision of a packing which can be compounded and molded into any desirable shape and placed in position for use more speedily than where it has to be transported in bulk from the place of manufacture and then packed into the piston-boxes or other position in which it is to be used.

My improved packing is manufactured of such ingredients combined in such proportions that it can be pressed or molded into shape at the place of manufacture and that it will retain its shape intact till used.

My invention consists in a novel combination of ingredients which act not alone as a packing around movable rods to prevent the escape of air, gas, or steam, but also act as a lubricant for the movable parts of the machinery on which it is used.

My invention further consists in the provision of a packing formed of the above-mentioned ingredients pressed or molded into suitable shapes, so as to be transported and applied to use without further manipulation.

My invention still further consists in the details more fully described hereinafter and specifically pointed out in the claims.

Figure 1:
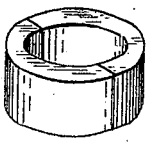
Figure 2:
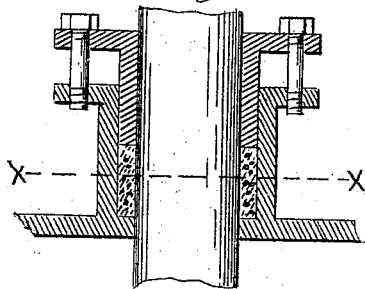
Figure 3:

In the accompanying drawings, Figure 1 is a perspective view of a packing-ring composed of blocks of segmental shape according to my invention. Fig. 2 is a central sectional view of a stuffing-box with the packing in position. Fig. 3 is a section on the line X X of Fig. 2.

In carrying my invention into effect I produce a plastic mass by the admixture of a metallic alloy in the form of pellets or granules, graphite in a finely-divided or flaky condition, grease having a high melting-point, and paraffin-wax, or other suitable ingredient. When these ingredients are mixed together in the proper proportions, the resultant mass is of such a consistency that it can be readily shaped into the desired form in molds by pressure, and it will retain its proper shape and consistency for an indefinite time.

I have found in practice that it is preferable to mold the packings in two semicylindrical halves, as shown in the drawings, so that the two parts can be placed in the packing-box surrounding the rod or piston, and by fastening the gland or covering for the packing-box the two halves will be slightly compressed and make a tight packing. It is obvious, however, that the packing may be made in the form of segments of a hollow cylinder less than semicylindrical.

By this method of forming the packing into such shapes as to fit snugly into the packing-box and around the rod or piston, there is absolutely no waste of the packing material, it is always of the proper rigidity to make perfect joints, it can be applied without the exercise of any skill and with practically no loss of time, and in many cases without interrupting the working of the machine to which it is to be applied.

Having thus described my invention, what I claim as new is—

1. A packing for piston-rods and the like, consisting of a cylindrical ring, formed of two or more segments, adapted to fit the cavity of a stuffing-box, and composed of lubricating and antifriction materials, mixed together, and molded into said segmental shape, said packing being of solid, compact, wax-like consistency, and the segments, self-sustaining, and adapted for transportation and use, without webbing or fibrous integument.

2. Packing for piston-rods and the like, composed of grease, graphite, a metallic alloy in the form of pellets, and wax, the ingredients being mixed together and molded into the shape of blocks or sections of segmental shape, adapted when brought together to form rings of packing, fitting the cavity of a stuffing-box, and to be transported and used without fibrous webbing or integument.

In testimony whereof I affix my signature in presence of two witnesses.

W. S. JARBOE.

Witnesses:
MARY M. HEDDEN,
THOS. A. CONNOLLY.